United States Patent
Gao et al.

(10) Patent No.: US 8,564,906 B2
(45) Date of Patent: Oct. 22, 2013

(54) POLE TIP SHIELD SHAPED TO PROVIDE A DIFFERENTIAL SHIELDING EFFECT ALONGSIDE THE MAGNETIC POLE TIP

(71) Applicant: Seagate Technology LLC, Cupertino, CA (US)

(72) Inventors: Kaizhong Gao, Eden Prairie, MN (US); Jianhua Xue, Maple Grove, MN (US); Yuming Zhou, Lakeville, MN (US); Dehua Han, Lakeville, MN (US); Eric S. Linville, Shakopee, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/630,893

(22) Filed: Sep. 28, 2012

(65) Prior Publication Data

US 2013/0022841 A1    Jan. 24, 2013

Related U.S. Application Data

(63) Continuation of application No. 12/404,579, filed on Mar. 16, 2009, now Pat. No. 8,279,562.

(51) Int. Cl.
G11B 5/33    (2006.01)

(52) U.S. Cl.
USPC ...................................................... 360/125.3

(58) Field of Classification Search
USPC ...................................................... 360/125.3
See application file for complete search history.

(56) References Cited

U.S. PATENT DOCUMENTS

| | | | |
|---|---|---|---|
| 5,978,176 A | 11/1999 | Exaki et al. | 360/103 |
| 6,414,824 B1 | 7/2002 | Sasaki | 360/317 |
| 6,930,863 B2 | 8/2005 | Biskeborn | 360/319 |
| 7,289,923 B2 | 10/2007 | Marovitz | 360/97.01 |
| 7,394,620 B2 | 7/2008 | Taguchi | 360/125 |
| 7,872,835 B2 | 1/2011 | Guan | 360/319 |

(Continued)

FOREIGN PATENT DOCUMENTS

| | | | |
|---|---|---|---|
| JP | 2005310363 A | 11/2005 | |
| JP | 2007328898 A | 12/2007 | |

(Continued)

OTHER PUBLICATIONS

Invitation to Pay Additional Fees and, Partial International Search Report for PCT/US2010/027496 filed Mar. 16, 2010, dated Jul. 2, 2010.

(Continued)

Primary Examiner — Mark Blouin
(74) Attorney, Agent, or Firm — Deirdre Megley Kvale; Westman, Champlin & Koehler, P.A.

(57) ABSTRACT

The application discloses a magnetic pole assembly having a pole tip arranged in a magnetic flux path and side shields separated from the pole tip by non-magnetic gap regions. The side shields are shaped to provide a differential shielding effect alongside the pole tip. As described, the sides shields are shaped to provide a non-magnetic gap region having a width that increases in the downtrack direction along a length of the pole tip. The increasing non-magnetic gap region alongside the pole tip provides a smaller non-magnetic gap region separating the pole tip from the side shields at the leading edge than the non-magnetic gap region separating the pole tip from the side shields at the trailing edge of the pole tip.

20 Claims, 19 Drawing Sheets

(56) References Cited

U.S. PATENT DOCUMENTS

| | | | |
|---|---|---|---|
| 7,995,307 B2 * | 8/2011 | Zheng | 360/125.13 |
| 8,120,874 B2 | 2/2012 | Hsiao et al. | 360/119.04 |
| 8,355,222 B2 * | 1/2013 | Mino et al. | 360/125.3 |
| 2001/0036044 A1 | 11/2001 | Urai | 360/318 |
| 2004/0252415 A1 | 12/2004 | Shukh et al. | 360/317 |
| 2005/0024766 A1 | 2/2005 | Khera et al. | 360/125 |
| 2005/0237665 A1 | 10/2005 | Guan et al. | 360/125 |
| 2006/0245109 A1 | 11/2006 | Hsu et al. | 360/126 |
| 2007/0139817 A1 | 6/2007 | Hirata et al. | 360/126 |
| 2007/0230044 A1 | 10/2007 | Han et al. | 360/125 |
| 2007/0230046 A1 | 10/2007 | Le et al. | 360/126 |
| 2007/0247749 A1 | 10/2007 | Bonhote et al. | 360/126 |
| 2007/0253107 A1 | 11/2007 | Mochizuki et al. | 360/126 |
| 2007/0268626 A1 | 11/2007 | Taguchi et al. | 360/126 |
| 2008/0100959 A1 | 5/2008 | Feldbaum et al. | 360/110 |
| 2008/0112088 A1 | 5/2008 | Hsiao et al. | 360/319 |
| 2008/0271308 A1 | 11/2008 | Hsiao et al. | 29/603.16 |
| 2008/0273268 A1 | 11/2008 | Hsiao et al. | 360/234.6 |
| 2008/0273277 A1 | 11/2008 | Guan et al. | 360/319 |
| 2010/0232062 A1 | 9/2010 | Gao et al. | 360/123.12 |

FOREIGN PATENT DOCUMENTS

| | | |
|---|---|---|
| JP | 2008171503 A | 7/2008 |
| JP | 2008262681 A | 10/2008 |
| JP | 2009004089 A | 1/2009 |
| JP | 2009048719 A | 3/2009 |

OTHER PUBLICATIONS

Notification of Transmittal of the International Search Report and Written Opinion of the International Searching Authority, or the Declaration for PCT/US2010/027496 filed Mar. 16, 2010, date of mailing Nov. 8, 2010; 16 pages.

Notification of Transmittal of the International Search Report and Written Opinion of the International Searching Authority, or the Declaration for PCT/US2010/48912 filed Sep. 15, 2010, date of mailing Nov. 8, 2010, 13 pages.

Notification of Transmittal of the International Search Report and Written Opinion of the International Searching Authority, or the Declaration for PCT/US2010/027496 filed Mar. 16, 2010, date of mailing Sep. 22, 2010; 16 pages.

* cited by examiner

POLE TIP SHIELD SHAPED TO PROVIDE A DIFFERENTIAL SHIELDING EFFECT ALONGSIDE THE MAGNETIC POLE TIP

CROSS-REFERENCE TO RELATED APPLICATION

This application claims priority to and the benefit of U.S. patent application Ser. No. 12/404,579 filed on Mar. 16, 2009, now U.S. Pat. No. 8,279,562 issued on Oct. 2, 2012, the contents of which is hereby incorporated by reference in its entirety.

BACKGROUND

Data storage devices store digitally encoded information or data on a magnetic storage media. Data is stored on the storage media using a magnetic recording head. Illustrative magnetic recording heads include a magnetic assembly having a pole tip and one or more auxiliary poles. A coil is energized to generate a magnetic flux path in the main pole and the one or more auxiliary poles to magnetically record data on a magnetic storage layer of the storage media. Data can be stored on the magnetic storage layer in a longitudinal or perpendicular pattern.

SUMMARY

A magnetic assembly having side shields extending alongside side edges of a pole tip. The side shields are shaped to provide a differential shielding effect alongside the pole tip. In illustrated embodiments described, the sides shields are shaped to provide a non-magnetic gap region having a width that increases in the downtrack direction along a length of the pole tip. The increasing non-magnetic gap width provides a smaller non-magnetic gap width separating the pole tip from the side shields at the leading edge than the non-magnetic gap width separating the pole tip from the side shields at the trailing edge of the pole tip.

DETAILED DESCRIPTION OF ILLUSTRATIVE EMBODIMENTS

Figure 1:
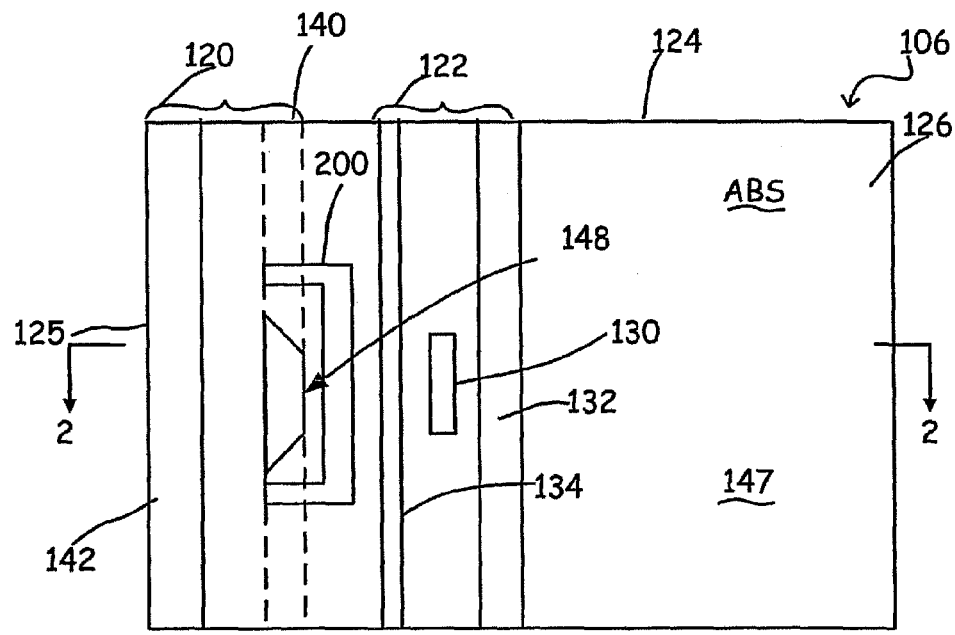
FIG. 1 is a plan view of one embodiment of a recording head illustrating an air bearing surface of the head which faces the storage media or disc surface.
Figure 2:
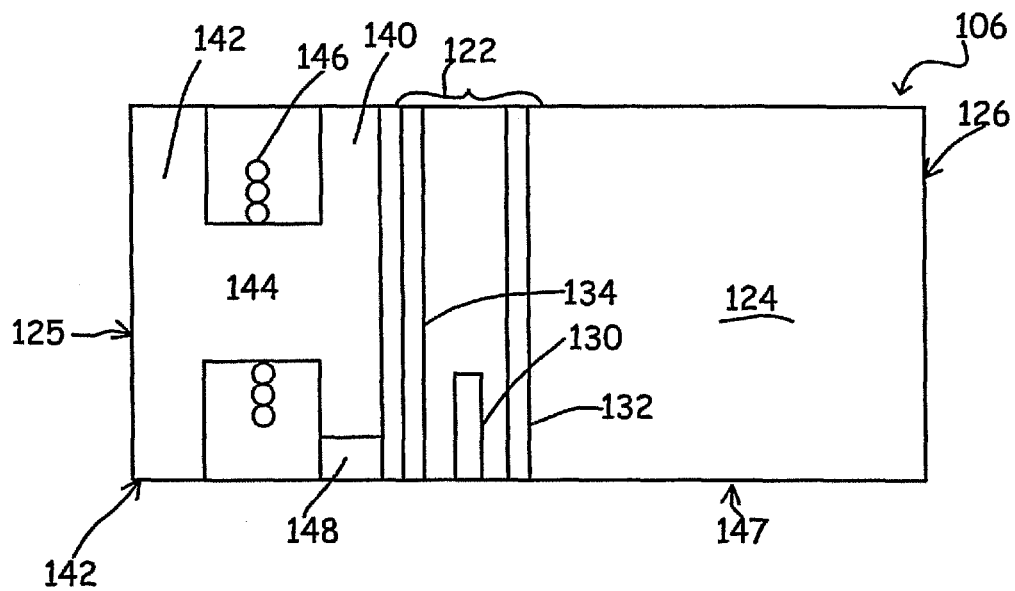
FIG. 2 is a cross-sectional view of the recording head as taken along line 2-2 of FIG. 1.

FIGS. 1-2 illustrate an embodiment of a magnetic recording head 106 to write or read data. In the illustrated embodiment, the head 106 includes a write element 120 and a read element 122 formed on a substrate 124, for example, using thin film deposition techniques. As shown, the write element 122 is fabricated proximate to a trailing edge 125 of the head spaced from a leading edge 126 of the head and substrate 124. In the illustrated embodiment, the read element 122 includes a sensor 130 that is configured to read the magnetically encoded data from a data storage media or disc. The sensor 130 is disposed between shields 132, 134 to isolate the sensor 130 from external magnetic fields that might interfere with read operations. Illustrative sensor elements 130 include magnetoresistive, giant magnetoresistive (GMR), tunneling magnetoresistive (TMR) or other sensors which, read magnetically encoded data.

As shown, the write element 120 includes a main pole 140 and an auxiliary pole 142. The main pole 140 and auxiliary pole 142 are magnetically connected via yoke portion 144 (shown in FIG. 2) to form a magnetic flux path. A conductive coil 146 is wound about the yoke portion 144 to induce a magnetic flux in the main pole 140 and the auxiliary pole 142. An insulating material fills a gap or area between the main pole 140 and auxiliary pole 142 and surrounds the conductive coil 146 to electrically insulate the conductive coil 146 from the main and auxiliary poles 140, 142. Embodiments disclosed herein include a pole tip shield 200 as shown in FIG. 1 and as described more fully herein.

Figure 3A:
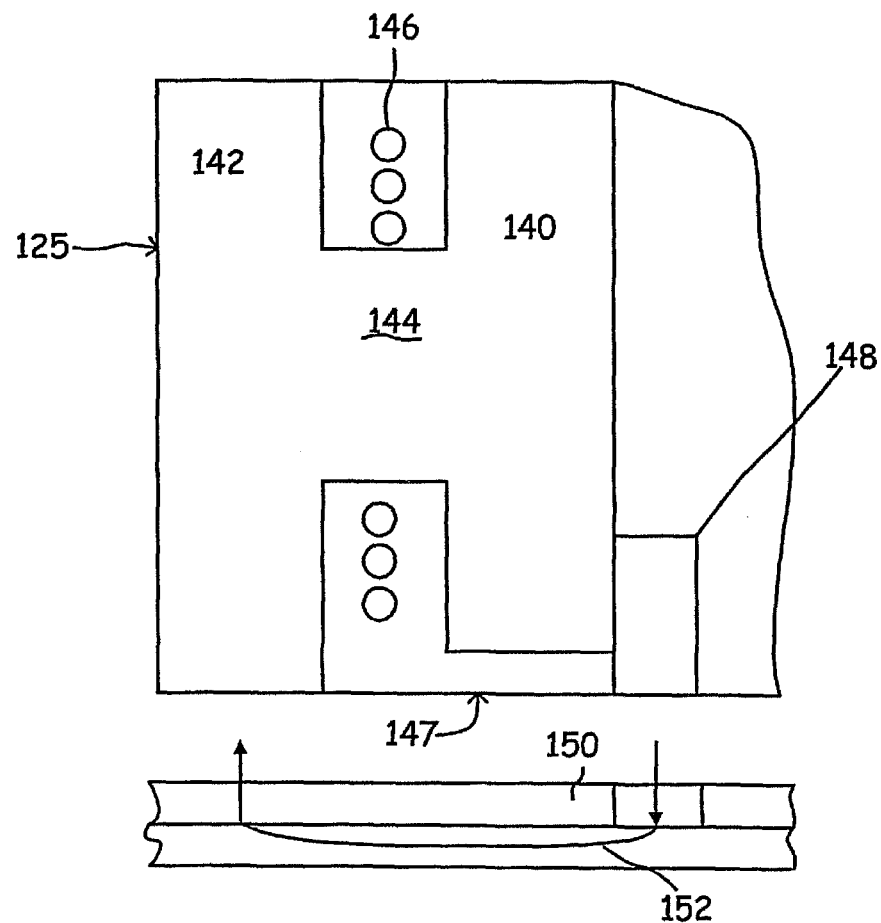
FIGS. 3A-3C schematically illustrate embodiments of a write element of a recording head for encoding data.
Figure 3B:
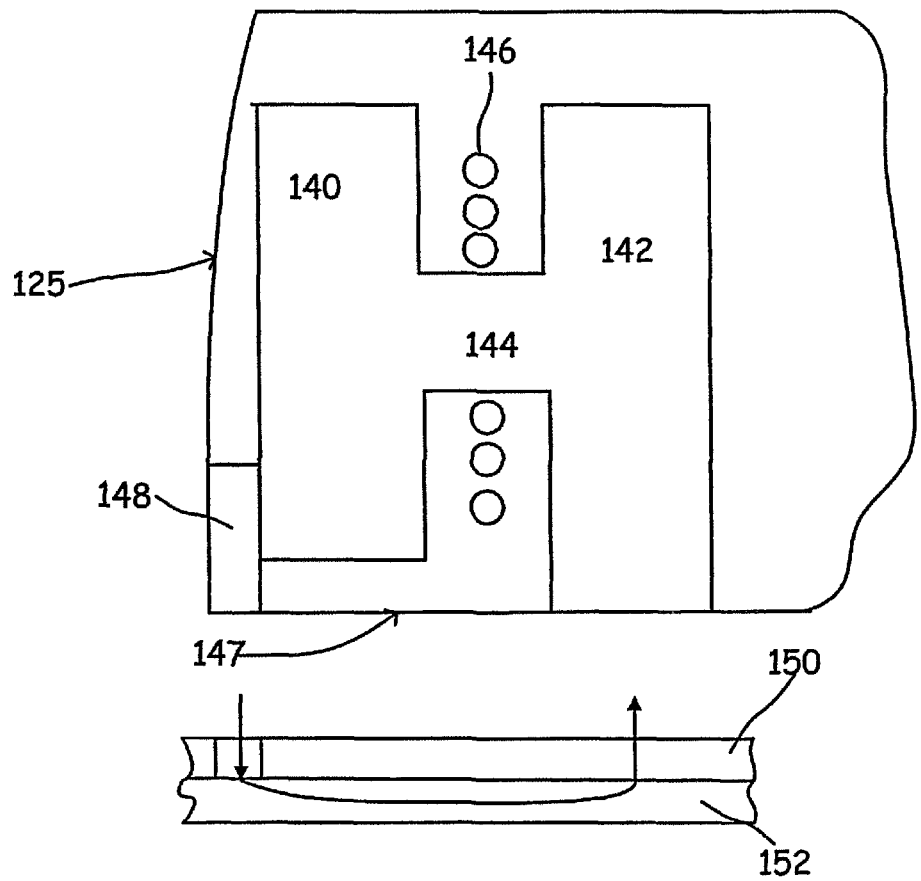

In the illustrated embodiment, the write element 120 and read element 122 are formed along an air bearing surface 147 of the head which faces a surface of the data storage media or disc. In an illustrated embodiment, rotation of the disc creates an air flow path along the air bearing surface 147 of the head. Air flows along the air bearing surface 147 from the leading edge 126 to the trailing edge 125 of the head. For proximity or near proximity recording, the air flow along the air bearing surface 147 is pressurized to provide a lifting force so that the head "floats" above the data storage media or disc 102. In illustrated embodiments, the air bearing surface 147 of the head is patterned using known etching processes to provide an optimum pressure profile and pitch for read and/or write operations. As shown in FIGS. 1-2, the main pole 140 has a pole tip 148 along the air bearing surface 147 of the head. Pole tip 148 can be an extension of the main pole 140 (as shown in FIG. 1) or a separate connected element located on either the leading side of the main pole 140 (as shown in FIG. 3A) or the trailing side (as shown in FIG. 3B). Typically, read and write elements 120, 122 are deposited on a wafer and the wafer is sliced to form the etched surfaces of the air bearing surface 147 of the head.

FIGS. 3A-3B are side cross-sectional views illustrating different write element embodiments or structures configured to record or write data to the magnetic storage media or disc 102. In each of the embodiments, the data storage media includes a magnetic recording layer 150 and a magnetic backing layer 152, although application is not limited to the particular storage media shown. For example, in another embodiment, a non-magnetic layer is interposed between the magnetic recording layer 150 and the magnetic backing layer 152. Embodiments disclosed in the application can also be used with an exchange coupled composite (ECC) media. In the illustrated embodiment, coil 146 is energized to induce the magnetic flux. The direction of the current in the coil 146 is reversed to change the direction of the magnetic flux path to record data bits in up and down orientations to perpendicularly encode data on the disc or storage media.

Figure 3C:
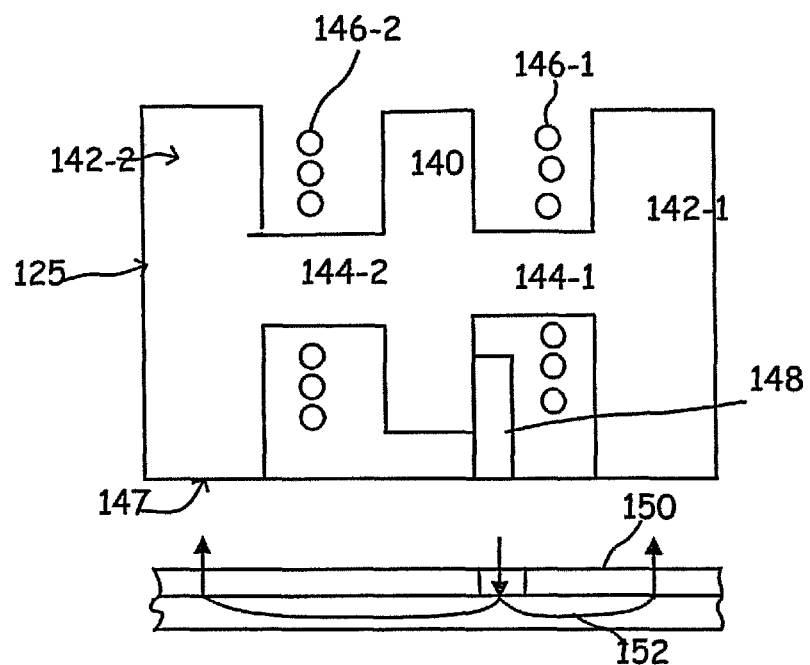

In the illustrated embodiment shown in FIG. 3A, the write element includes main pole 140 having a pole tip 148 and an auxiliary pole 142 spaced from the pole tip 148 in the trailing edge direction. When the coil 146 is energized, a flux path or circuit is formed as shown to perpendicularly record data on the magnetic recording layer 150. In an alternate embodiment shown in FIG. 3B, the pole tip 148 is positioned proximate to the trailing edge of the head 106 and the auxiliary pole 142 is spaced from the pole tip 148 in a direction towards the leading edge. FIG. 3C illustrates another embodiment of a magnetic recording head where the write element includes multiple auxiliary poles 142-1, 142-2. Coils 146-1, 146-2 are wound about yokes 144-1, 144-2 connecting the auxiliary poles 142-1, 142-2 to the main pole 140. The coils 146-1, 146-2 are energized to provide multiple flux paths as shown to record data to the magnetic recording layer 150 of the data storage media.

Figure 4:
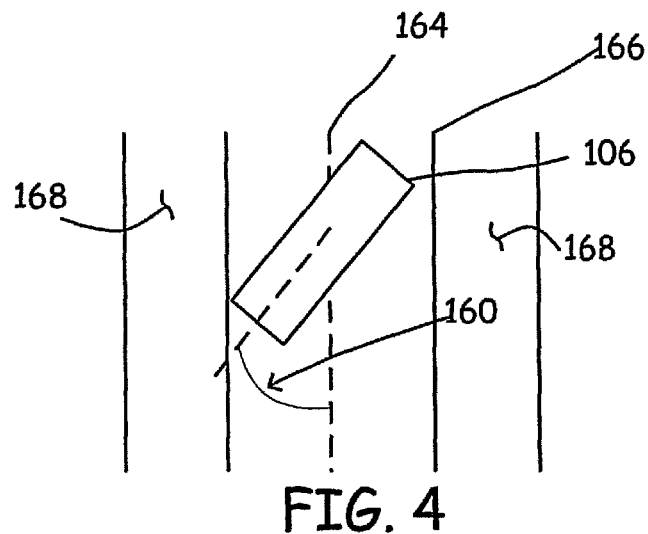
FIG. 4 is a schematic illustration of an orientation of a head relative to a data track on a magnetic storage media.
Figure 5:
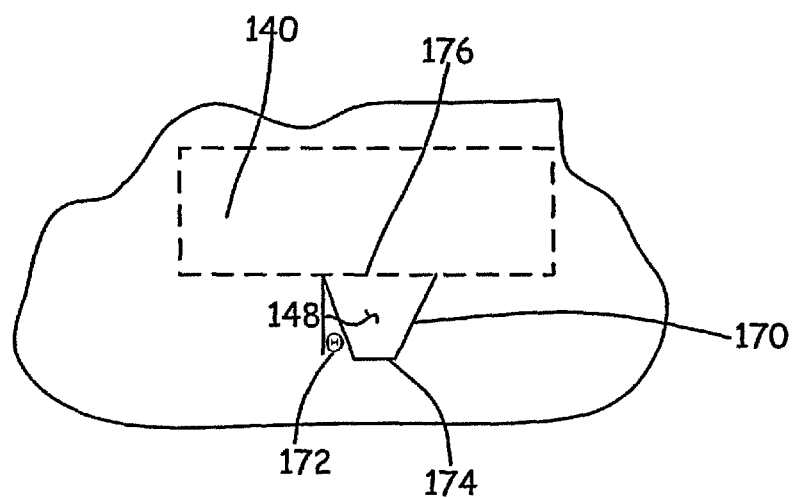
FIG. 5 schematically illustrates an embodiment of a pole tip having a wall angle to compensate for skew of the head relative to data tracks on the magnetic storage media.

The head 106 is positioned relative to select data tracks via a positioning or actuation device. As schematically illustrated in FIG. 4, the head is positioned on the media such that there is a skew angle 160 between the head and a center-line 164 of the track 166. Since the orientation of the head (and write element) is offset at a skew angle 160 (in this example of approximately 15 degrees) relative to the center-line 164 of track 166, the write element can interfere with data recorded in adjacent tracks 168. In prior designs as shown in FIG. 5, the main pole tip 148 (of the main pole 140) has a trapezoidal shape 170 to provide a wall angle 172 between a leading edge 174 and trailing edge 176 of pole tip 148. The wall angle 172 provides a narrow width profile at the leading edge of the pole tip and a wider profile at the trailing edge to reduce adjacent track interference (ATI) proximate to the leading edge of the pole tip 148.

Figure 6A:
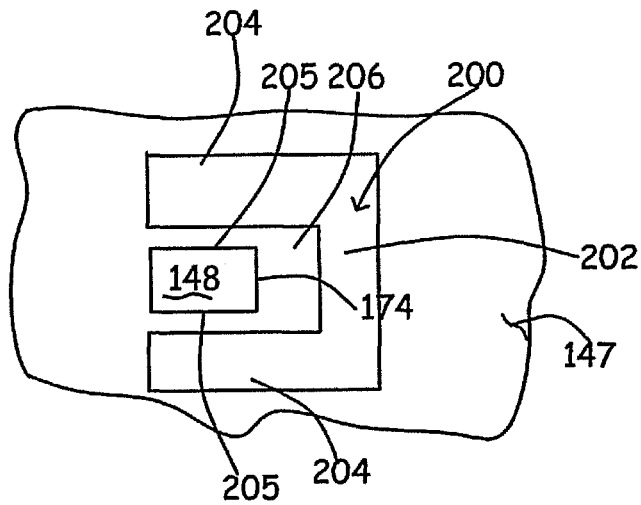
FIGS. 6A-6C schematically illustrate embodiments of a pole tip shield for a pole tip of a write element.
Figure 6B:
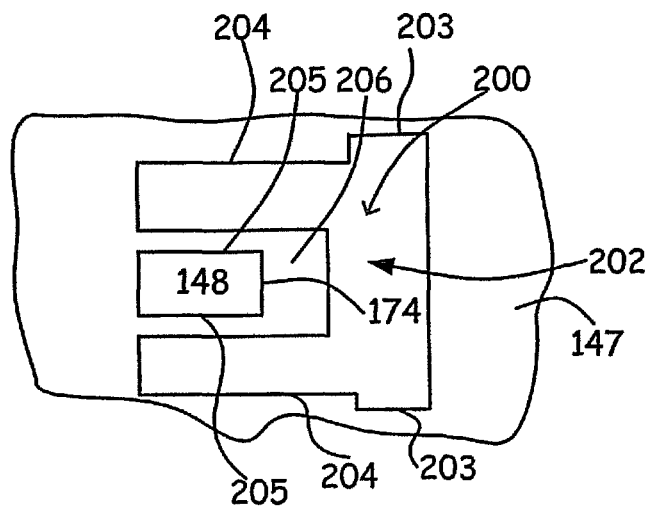
Figure 6C:
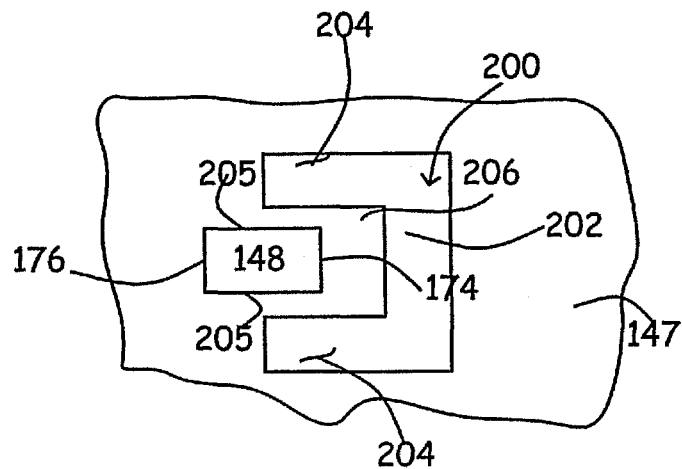

FIGS. 6A-6C illustrate embodiments of a pole tip shield 200 having application for a write element of a recording head as viewed from the air bearing surface 147 of the head facing the media or disc. In the illustrated embodiments, the pole tip shield 200 is generally "U" shaped and includes a leading edge portion 202 forward of the leading edge 174 of the main pole tip 148 and side shields 204 that extend along sides 205 of the main pole tip 148. In an illustrated embodiment, the main pole tip 148 comprises a ferromagnetic material, such as, but not limited to, iron (Fe), cobalt (Co), and combinations thereof, such as, iron cobalt ($Co_xFe_y$ (where $x \cong 20\text{-}45\%$ and $y \cong 55\text{-}80\%$)), iron nickel ($Fe_yNi_x$ (where $x \cong 55\text{-}95\%$ and $y \cong 5\text{-}45\%$)), cobalt iron nickel ($Co_xFe_yNi_z$ (where $x \cong 15\text{-}55\%$, $y \cong 10\text{-}80\%$, and $z \cong 5\text{-}35\%$)) or other ferromagnetic materials. In addition, the write pole tip can be also in a laminated structure or made of only one alloy of those mentioned above.

The pole tip shield 200 in some embodiments is also formed of a ferromagnetic material such iron cobalt ($Co_xFe_y$ (where $x \cong 20\text{-}45\%$ and $y \cong 55\text{-}80\%$)), iron nickel ($Fe_yNi_x$ (where $x \cong 55\text{-}95\%$ and $y \cong 5\text{-}45\%$)), or cobalt iron nickel ($Co_xFe_yNi_z$ (where $x \cong 15\text{-}55\%$, $y \cong 10\text{-}80\%$, and $z \cong 5\text{-}35\%$)). In one embodiment, both the pole tip 148 and shield 200 are formed of a high moment alloy, such as Fe60Co40. A gap area 206 between the shield 200 and main pole tip 148 is filled with a non-magnetic and electrically insulating material such as Alumina.

Figure 7:
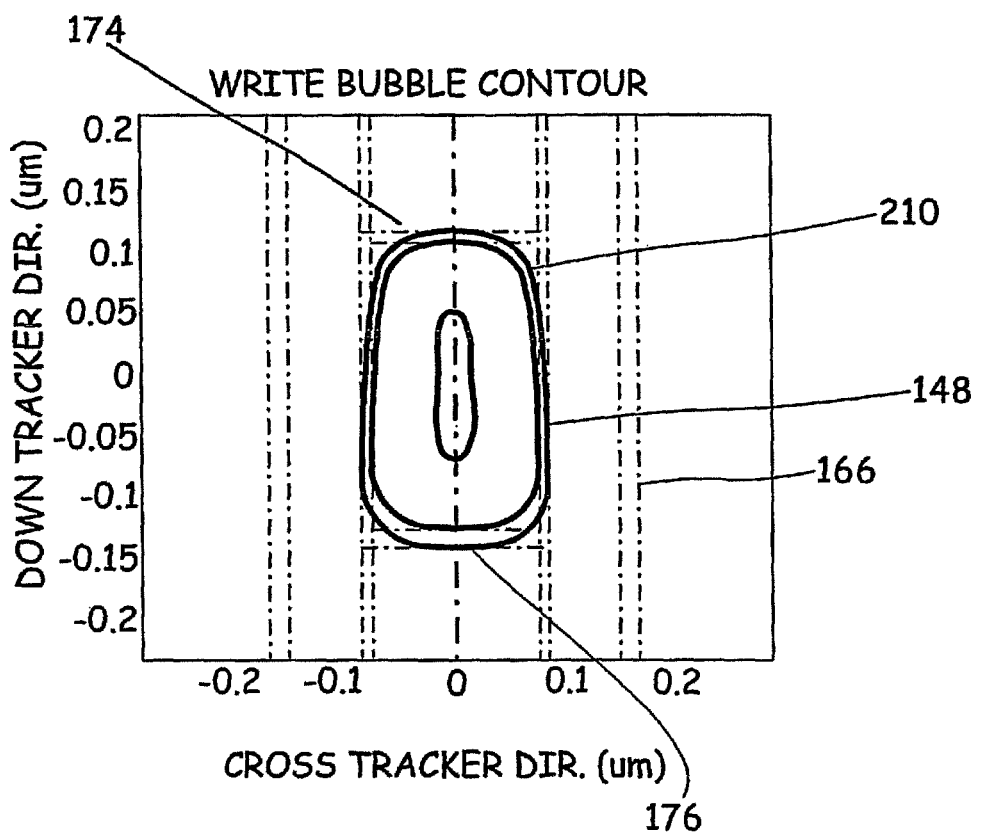
FIG. 7 schematically illustrates a magnetic field profile having a magnetic wall angle to reduce ATI.

When the write pole is energized to encode data on the media, the write pole tip 148 is close to saturation. In the illustrated embodiments of FIGS. 6A-6C, part of the magnetic flux is shunted into the shield 200 so that an opposite magnetic charge accumulates on a surface of the shield 200 causing a net field decrease and field angle change proximate to the shield 200. The field angle change provides a magnetic wall angle or contour to limit or reduce ATI. The "U" pole tip shield 200 as described is configured to provide a magnetic write bubble 210 in a generally trapezoid shape as shown in FIG. 7. The trapezoidal shape of the magnetic write bubble 210 forms the magnetic wall angle to provide a narrow field width or profile proximate to the leading edge 174 to reduce ATI. The magnetic-write bubble 210 of the pole tip 148 also includes a relatively wider field width profile proximate to the trailing edge 176 with relation to track 166. As described in an illustrated embodiment, the pole tip shield 200 can be formed of different magnetic materials or compositions (including different compositions of the materials discussed above having different x, y or z percentages) to provide variable magnetic moments or properties in the shield 200 to optimize the magnetic wall angle for write operations as described herein.

In the embodiments illustrated in FIG. 6A-6B, side shields 204 of the generally "U" shaped shield 200 extend along the length of sides 205 of the pole tip 148 generally from the leading edge 174 to the trailing edge 176 of the pole tip 148. In the embodiment illustrated in FIG. 6B, the side shields 204 are recessed inward from side edges 203 of the leading edge portion of the pole tip shield 200.

In the embodiment shown in FIG. 6C, the length of the side shields 204 of the shield 200 is shorter than the length of the sides 205 of the pole tip 148. In particular, in the embodiment shown in FIG. 6C, the side shields 204 of the shield 200 extend to about midlength of the pole tip 148.

In illustrated embodiments, the side shields 204 of the "U" shaped pole tip shield 200 are configured to provide a variable magnetic moment along a length of the side shields 204 of the shield 200. In particular, in an illustrated embodiment, the leading edge portion of the pole tip shield 200 has a larger magnetic moment than a trailing edge portion to shape the magnetic wall angle proximate to the leading edge of the pole tip 148. In an illustrated embodiment, the side shields 204 of the "U" shaped pole tip shield 200 can be formed of different magnetic materials or compositions along a length thereof to provide different magnetic moments to optimize magnetization and the write field.

Figure 8A:
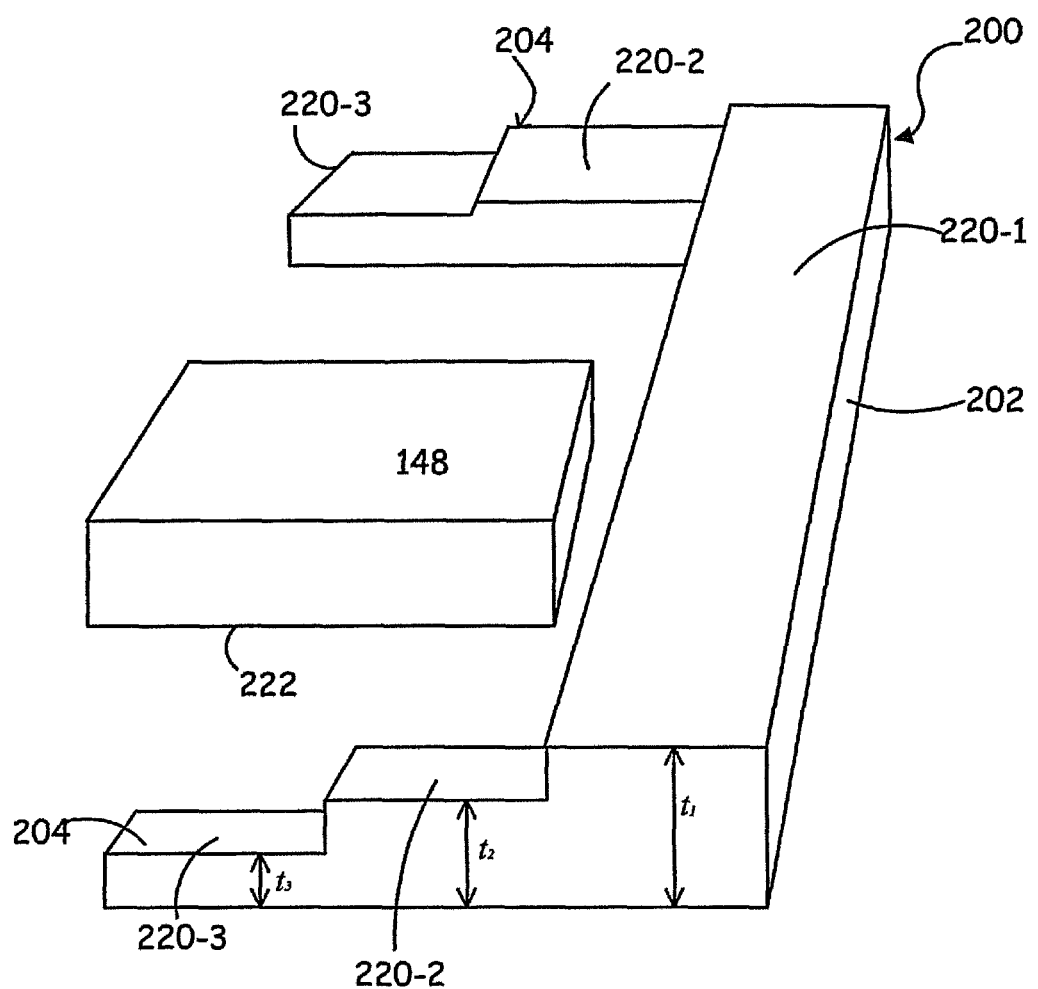
FIGS. 8A-8B schematically illustrate embodiments of a pole tip shield for a pole tip of a write element having stepped thickness segments.
Figure 8B:
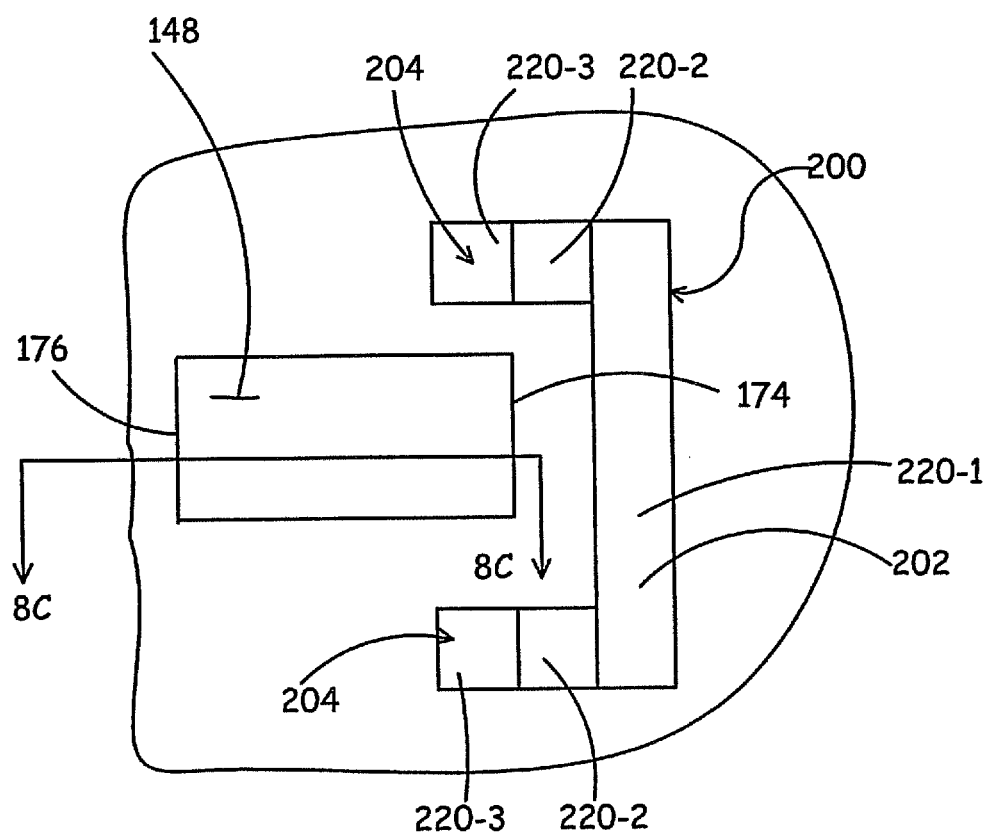

FIGS. 8A-8B illustrate embodiments of a "U" shaped pole tip shield 200 including different thickness dimensions along a length of the pole tip shield 200 to provide different magnetic moments along a length of the side shields 204 of the "U" shaped pole tip shield 200. In the embodiments shown in FIGS. 8A-8B, the different thickness dimensions are formed via stepped thickness segments. Each of the stepped thickness segments provides a different field effect or field angle change along the length of the pole tip 148. In an illustrated embodiment, the different thickness segments can be of different magnetic materials or compositions with different magnetic moments to shape the angle or dimension of the magnetic wall angle.

In the illustrated embodiments, the pole tip 148 includes a rectangular shape forming a generally planar surface 222 facing the media to provide optimum write pole tip area at the air bearing surface 147, while, the stepped thickness segments or different thickness dimensions optimize the magnetic field or wall angle to reduce ATI. Illustratively, the pole tip shield 200 is configured to provide a magnetic wall angle of approximately 4-5 degrees, however application is not limited to a specific wall angle dimension. In addition, the rectangular pole enabled by the shield configuration greatly simplifies the writer process especially as the dimensions of the pole tip are reduced to accommodate high areal density.

Specifically, in the embodiment illustrated in FIG. 8A, the pole tip shield 200 includes a leading edge portion 202 having a first thickness segment 220-1 having a thickness dimension $t_1$. Side shields 204 of the pole tip shield 200 shown in FIG. 8A include a second thickness segment 220-2 having a second thickness dimension $t_2$ and a third thickness segment 220-3 having a third thickness dimension $t_3$, where $t_3 < t_2 < t_1$ As shown in FIG. 8A, the larger thickness segments 220-1 and 220-2 provide a larger field angle change or effect to provide a narrow field profile proximate to the leading edge while the smaller thickness segment 220-3 provides a smaller field angle change proximate to the trailing edge. As shown in FIG. 8A, the first, second and third thickness segments 220-1, 220-2, 220-3 are separated by a thickness step, although application is not limited to the specific embodiment illustrated in FIG. 8A. In the illustrated embodiment, thickness steps are orientated so that thickness segments 220-1, 220-2, 220-3 have a common co-planar surface along the air bearing surface 147. In an alternate embodiment, the thickness steps are recessed from the air bearing surface 147. In addition to the stepped thickness segments 220-1, 220-2, 220-3 or as an alternative, in illustrated embodiments, the pole tip shield 200 includes different material segments to provide a narrow field profile proximate to the leading edge of the pole tip 148.

Figure 8C:
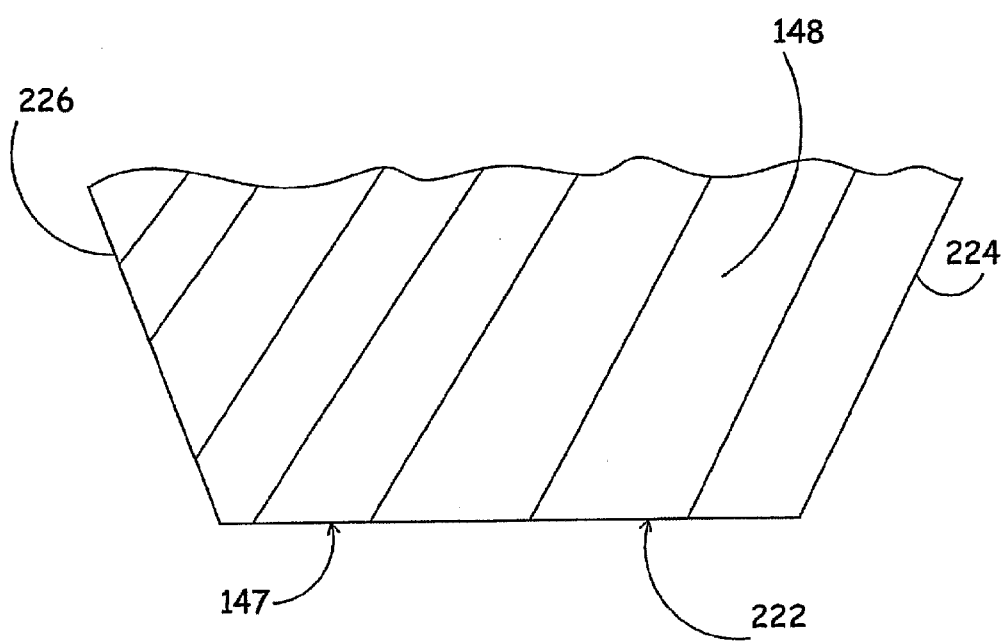
FIG. 8C is a cross-sectional view taken along line 8C-8C of FIG. 8B illustrating a profile of the pole tip.

FIG. 8B illustrates a pole tip shield 200 including multiple stepped thickness segments 220-1, 220-2, 220-3 similar to the embodiment shown in FIG. 8A. In the embodiment shown in FIG. 8B, the side shields 204 include a shortened length dimension relative to the length of the pole tip 148 between the leading edge 174 and trailing edge 176. In the illustrated embodiments, the main pole tip 148 includes a generally planar surface 222 facing the disc media. As shown in FIG. 8C, the pole tip 148 includes a contoured profile providing a sloped leading edge surface 224 and a sloped trailing edge surface 226 to provide a tapered profile to the planar surface 222 of the pole tip 148 leading up to the air bearing surface 147.

Figure 8D:
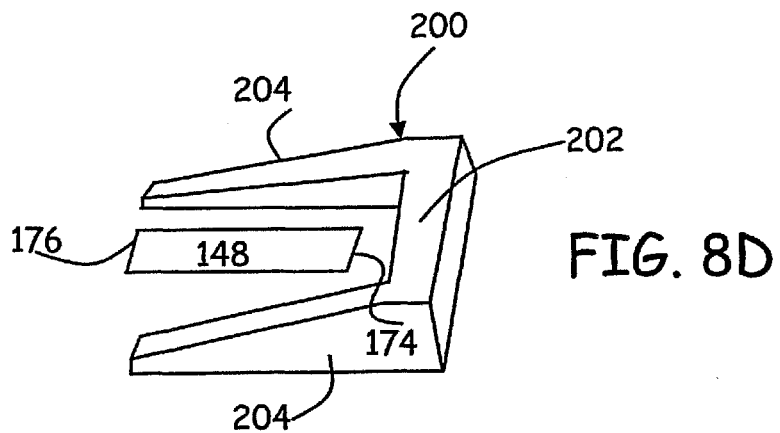
FIGS. 8D-8G schematically illustrate embodiments of a pole tip shield having a variable geometry to shape the magnetic wall angle of the pole tip.

Although in the illustrated embodiments of FIGS. 8A-8B stepped thickness segments 220-1, 220-2, 220-3 are shown, the present invention is not limited to an embodiment having the discrete stepped segments as shown. In illustrated embodiments, the pole tip shield 200 can employ different geometries to vary the magnetic moment along a length of the side shields 204 of the shield 200 to configure the shape of the magnetically induced wall angle to optimize the magnetic field profile. For example, in the embodiment illustrated in FIG. 8D, the side shields 204 have a sloped thickness dimension. As shown, the sloped thickness dimension provides a larger thickness dimension at the leading edge and a smaller thickness dimension proximate to the trailing edge of the side shields 204 of the "U" shaped shield 200 of FIG. 8D. As previously described, the side shields 204 can have a co-planar surface along the air bearing surface 147 or a sloped contour along the air bearing surface 147.

Figure 8E:
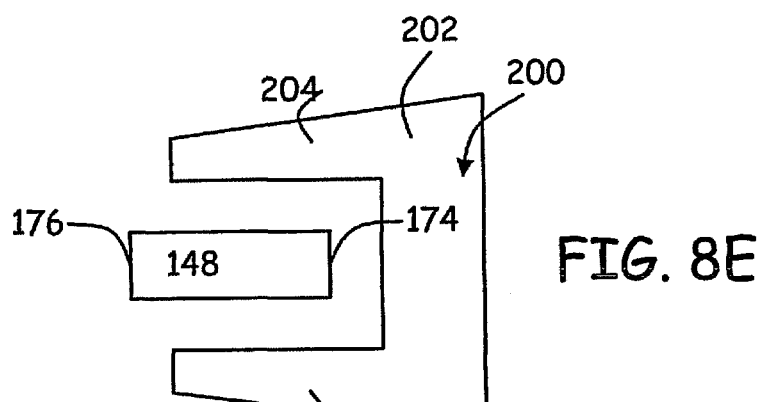
Figure 8F:
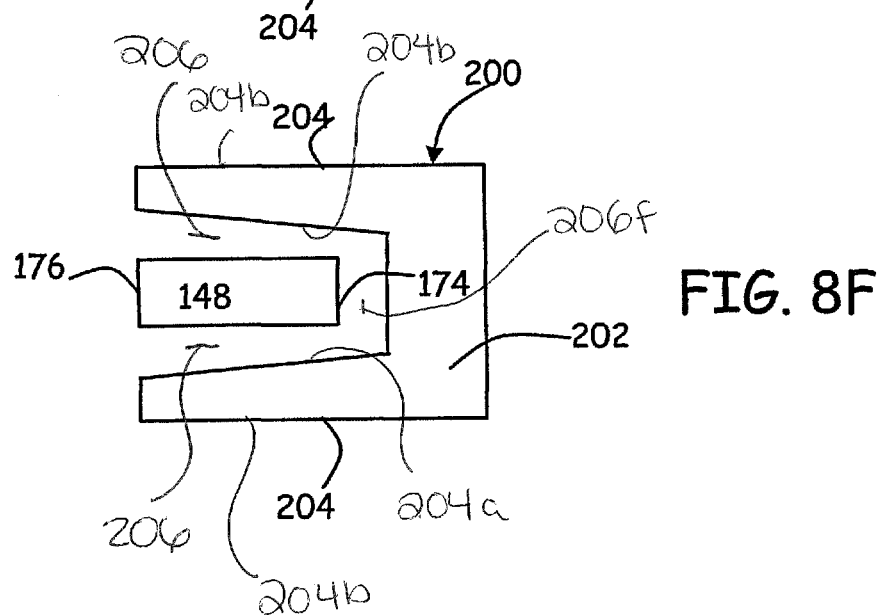

In alternate embodiments shown in FIGS. 8E and 8F, the shield 200 include a tapered width profile. In particular, as shown in FIG. 8F, side shields 204 having a length extending alongside the length of the pole tip between the leading and trailing edges 174, 176. A width of the side shields 204 extends between tapered inner edges 204a and non-tapered outer edges 204b. The tapered inner edges 204a form a non-conformal non-magnetic gap region 206 having a tapered width that increases in the downtrack direction along the length of the pole tip 148. As shown, portions of the side shields 204 extend forward of the leading edge of the pole tip. As shown a non-magnetic gap region 206f is formed forward of the pole tip. The non-magnetic gap region 206f forward of the pole tip is tapered in the downtrack direction as shown.

Figure 8G:
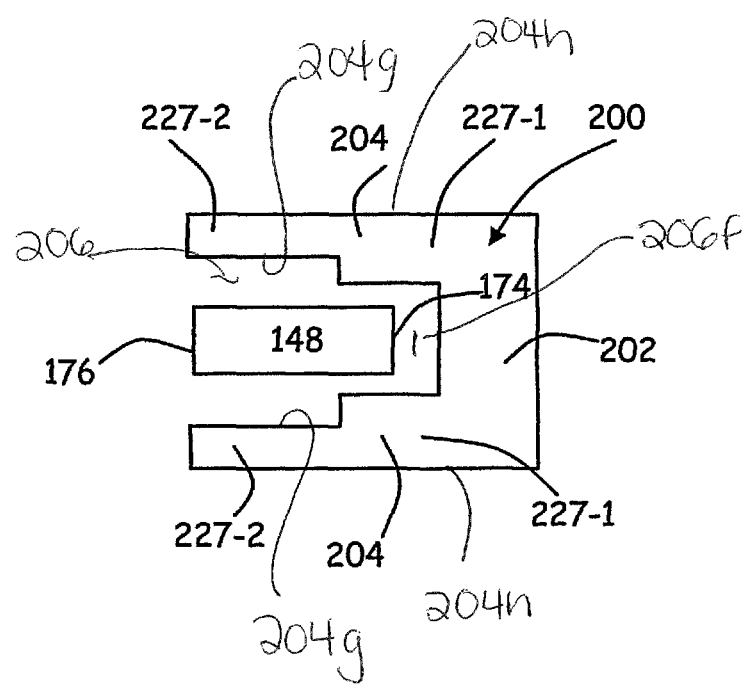

In another embodiment illustrated in FIG. 8G, the shield 200 includes a plurality of stepped width segments 227-1, 227-2 to provide different magnetic moments or differential shielding to shape the angle or dimension of the magnetic wall angle as previously described. In particular, as shown, a width of the side shields 204 extends from a stepped inner side edges 204g to an outer side edge 204h. The stepped inner edges 204g provide the multiple width segments 227-1, 227-2. Width segment 227-1 has a larger dimension than width segment 227-2 to provide a narrower field profile proximate to the leading edge 174 of the pole tip 148. As shown, the stepped shape of the side shields 204 provides a non-conformal non-magnetic gap region 206 having a width that increases in the downtrack direction to provide the differential shielding effect and limit flux leakage at the trailing edge 176 of the pole tip. The assembly also includes a non-magnetic gap region 206f forward of the pole tip 148.

Figure 9A:
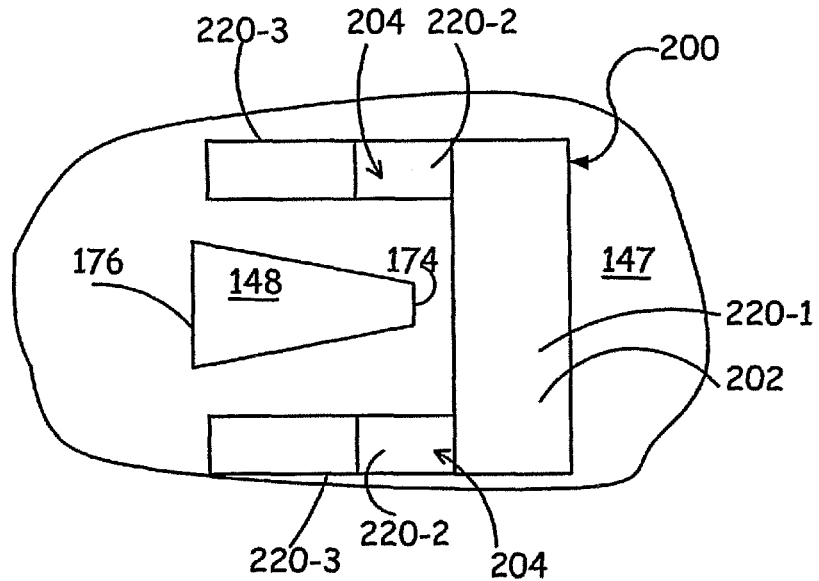
FIGS. 9A-9B schematically illustrate embodiments of a pole tip shield for a pole tip of a write element having stepped thickness segments and a contoured pole tip.
Figure 9B:
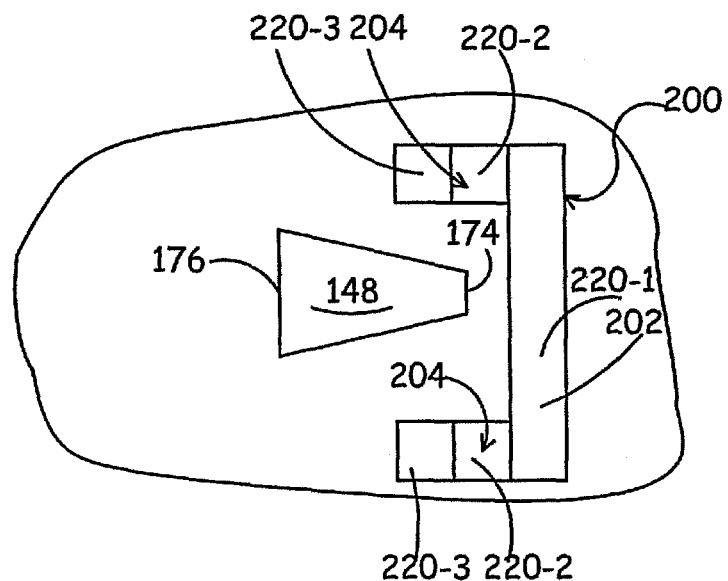

FIGS. 9A-9B illustrate an alternate embodiment of a write element. In the embodiment shown in FIG. 9A, the write element includes pole tip shield 200 including a leading edge portion 202 and side shields 204. In the embodiment illustrated in FIG. 9A, the length of the side shields 204 extends along a length of the sides of the pole tip 148 generally from the leading edge 174 to the trailing edge 176 of the pole tip 148. In the illustrated embodiment, the pole tip 148 is shaped or contoured to provide a narrower width dimension at the leading edge 174 and wider width dimension proximate to the trailing edge 176 to enhance the magnetic field profile in combination with the pole tip shield 200. For example, in an illustrative embodiment, the pole tip 148 is contoured to provide a 4-5 degree physical wall angle and the combination of the pole tip contour and pole tip shield 200 (with stepped portions 220-1, 220-2, 220-3 as shown) are designed to provide an effective wall angle of 10+ degrees.

In another embodiment illustrated in FIG. 9B, the side shields 204 of the pole tip shield 200 have a shortened length dimension, smaller than a length dimension of the sides of the pole tip 148 between the leading and trailing edges 174, 176 of the pole tip 148. In each of the illustrated embodiments of FIGS. 9A-9B, the pole tip shields 200 include stepped thickness segments 220-1, 220-2 and 220-3 as previously described with respect to FIGS. 8A-8B. Alternatively, other embodiments include embodiments of the "U" shaped pole tip shield as described herein in combination with a contoured pole tip as shown in FIGS. 9A-9B.

Figure 10A:
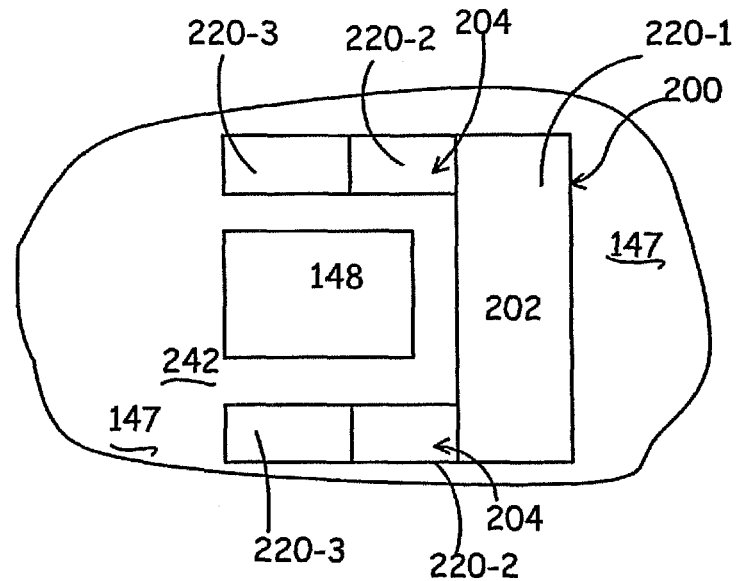
FIGS. 10A-10B schematically illustrate embodiments of a write element including a pole tip shield.
Figure 10B:
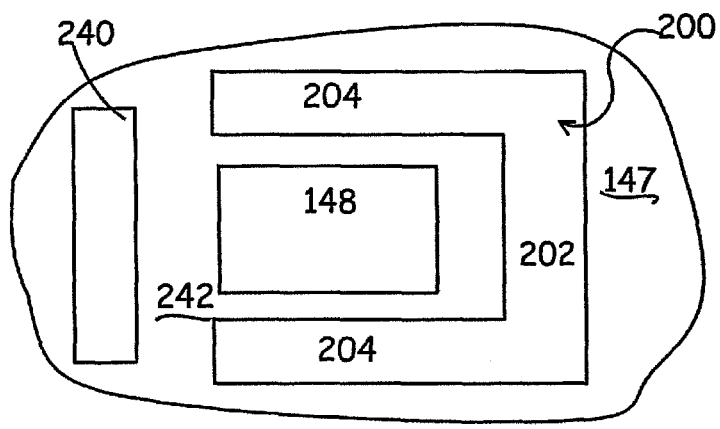

FIGS. 10A and 10B illustrate embodiments of a write element including a pole tip shield 200. In the embodiment illustrated in FIG. 10B, the write element includes a trailing edge shield 240 separate from the pole tip shield 200. As shown, the trailing edge shield 240 is spaced from the pole tip shield 200 to form a gap 242 between the pole tip shield 200 and the trailing edge shield 240 along the air bearing surface 147 of the head 106. The gap 242 between the pole tip shield 200 and trailing edge shield 240 along the air bearing surface 147 is filled with a non-magnetic material, such as Alumina. In the embodiment illustrated in FIG. 10A, the pole tip shield 200 has different thickness dimensions in contrast to the pole tip shield 200 illustrated in FIG. 10B. As shown, in FIG. 10A, the different thickness dimensions are formed by stepped thickness segments 220-1, 220-2, 220-3 as shown and previously described. In another embodiment, the pole tip shield 200 of FIG. 10B can include stepped thickness segments 220-1, 220-2, 220-3 as shown in FIG. 10A.

FIGS. 11A-11E illustrate embodiments of write elements including a pole tip shield 200. In the illustrated embodiments shown in FIGS. 11B-11E, the write element includes a trailing edge shield 240 separated from and spaced from the pole tip shield 200 along the air bearing surface 147 of the head 106. In each of the illustrated embodiments, the pole tip shield 200 is magnetically connected to an auxiliary pole 142 to provide a flux connection between the pole tip shield 200 and the auxiliary pole 142 as previously illustrated in FIG. 3B. The auxiliary pole 142 provides a flux path for magnetic charge from the shield 200 to enhance the magnetic wall angle of the pole tip 148.

Figure 11A:
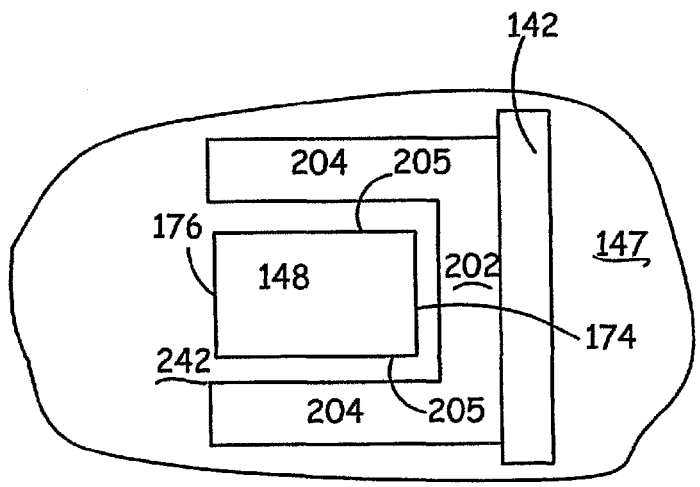
FIGS. 11A-11E schematically illustrate embodiments of a write element including a pole tip shield magnetically connected to an auxiliary pole.
Figure 11B:
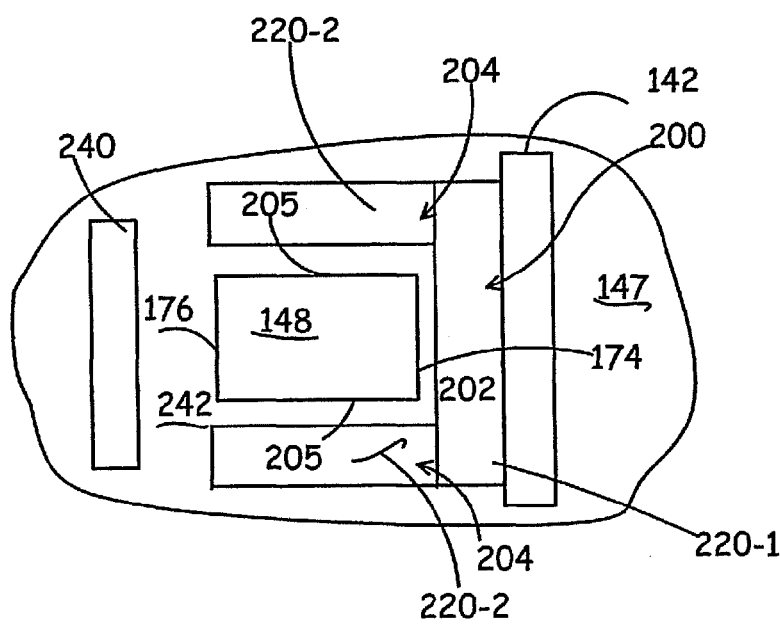
Figure 11C:
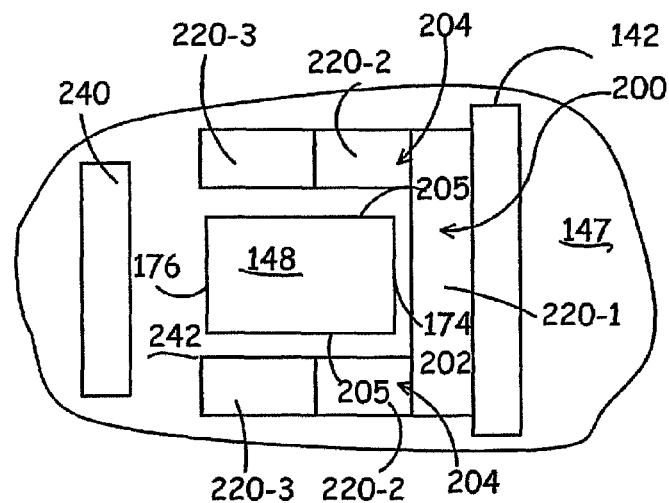

In the illustrated embodiments of FIGS. 11A-11C the pole tip shield 200 includes a leading edge portion 202 and side shields 204. In FIGS. 11A-11C, the side shields 204 have an elongate length extending along the sides 205 of the pole tip 148 generally from the leading edge 174 to the trailing edge 176 of the pole tip 148. In the embodiment illustrated in FIG. 11B, the leading edge portion 202 and side shields 204 include stepped thickness segments 220-1, 220-2 to provide different thickness dimensions of the shield 200. In the embodiment illustrated in FIG. 11C, the shield 200 includes stepped thickness segments 220-1, 220-2, 220-3 to form the different thickness dimensions of the shield 200. In each of the embodiments shown in FIGS. 11A-11B, the write element could include a trailing edge shield as in FIG. 11B or not include a trailing edge shield 240 as in FIG. 11A. Illustratively the thickness of the trailing edge shield 240 is similar to the thickness of the leading edge portion of the pole tip shield 200. In illustrated embodiments, auxiliary pole 142 is connected to the pole tip shield 200 to enhance magnetic wall angle. In an exemplary embodiment having a trailing edge shield 240, auxiliary pole 142 can be connected to the trailing edge shield 240.

Figure 11D:
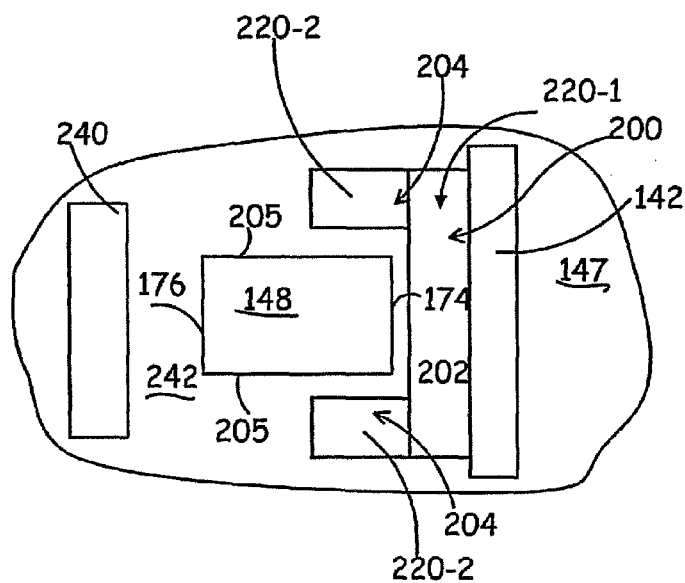
Figure 11E:
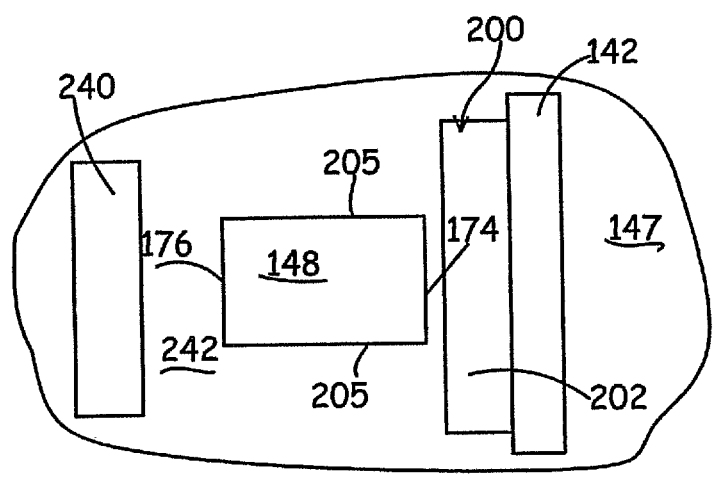

In FIG. 11D, the pole tip shield 200 includes a leading edge portion 202 and shortened side shields 204. In the illustrated embodiment, the leading edge portion and side shields 204 include different thickness dimensions formed by the stepped thickness segments 220-1, 220-2 similar to embodiments previously described. FIG. 11E illustrates an embodiment of a pole tip shield 200 coupled to the auxiliary pole 142 and a trailing edge shield 240 separated from and spaced from the pole tip shield 200 along the air bearing surface 147. As shown, the pole tip shield 200 includes a leading edge portion 202 spaced forward of the leading edge of the pole tip to provide a magnetic field profile for writing. In each of the illustrated embodiments, alternate features can be employed as described herein to shape the magnetic profile or wall angle of the write element of the head.

Figure 12A:
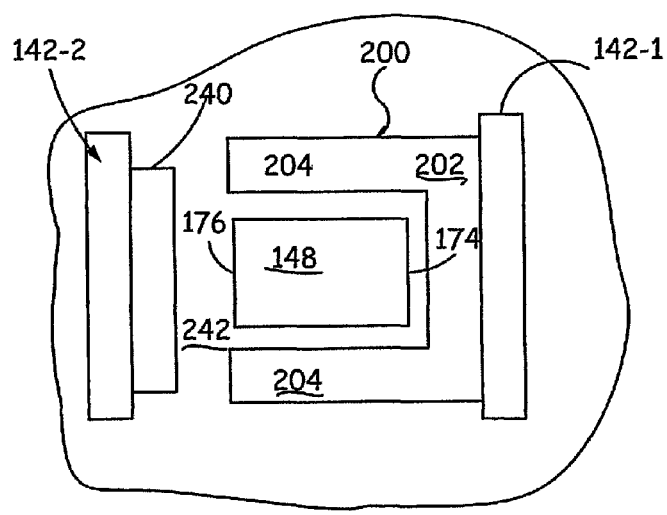
FIGS. 12A-12B illustrate embodiments of a write element including a pole tip shield magnetically connected to a first auxiliary pole and a leading edge shield spaced from the pole tip shield and magnetically connected to a second auxiliary pole.
Figure 12B:
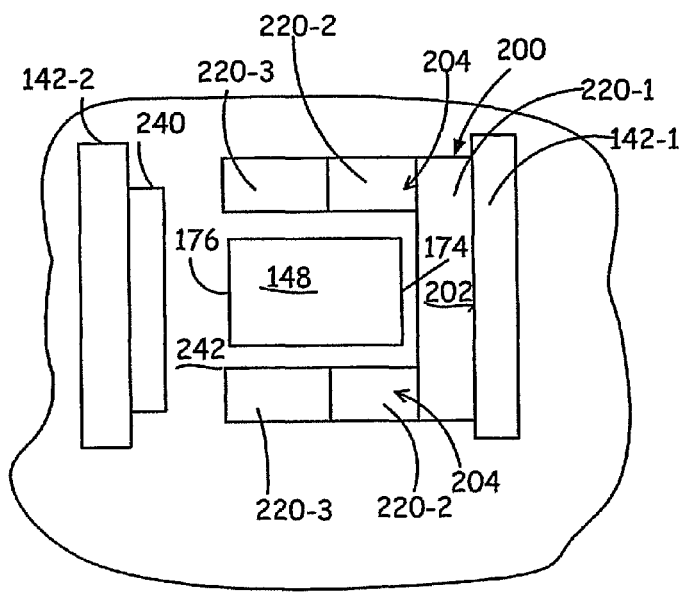

FIGS. 12A-12B illustrate embodiments of write elements that include auxiliary poles 142-1, 142-2 connected to the main pole via yokes as previously illustrated in FIG. 3C. Each of the illustrated embodiments in FIGS. 12A and 12B includes a pole tip shield 200 and a trailing edge shield 240. In the illustrated embodiments in FIGS. 12A-12B, the pole tip shield 200 includes a leading edge portion 202 and side shields 204. The shield is magnetically connected to the first auxiliary pole 142-1 forward of the leading edge of the pole tip 148. The trailing edge shield 240 is spaced from the pole tip shield 200 and is magnetically coupled to the second auxiliary pole 142-2 aft of the pole tip 148. As shown, the pole tip shield 200 and trailing edge shield 240 are separated via a non-magnetic gap 242 along the air bearing surface 147 and are magnetically connected through connection of the auxiliary poles 142-1, 142-2 to main pole 140 as previously illustrated in FIG. 3C. In the embodiment illustrated in FIG. 12B, the pole tip shield 200 includes stepped thickness segments 220-1, 220-2, 220-3 as previously described in relation to other embodiments disclosed in the application, although other applications can utilize alternate features described herein.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment described herein is directed to a particular data storage application, it will be appreciated by those skilled in the art that the teachings of the present invention can be applied to other data storage applications, without departing from the scope and spirit of the present invention.

Additionally, although illustrated embodiments disclosure features arranged in a particular combination, other applications or embodiments can incorporate one or more features described herein and application is not limited to the specific combinations or arrangements shown.

What is claimed is:

1. A magnetic assembly comprising:
   a pole assembly configured to induce a magnetic flux in a pole tip having a length extending between a leading edge and a trailing edge and a width extending between side edges;
   a pole tip shield including side shields alongside the pole tip and the side shields having tapered inner side edges spaced from the pole tip and extending alongside the entire length of the pole tip between the leading edge and the trailing edge of the pole tip; and
   non-magnetic gap regions between the tapered inner edges of the side shields and the side edges of the pole tip having a non-magnetic gap width that increases in the downtrack direction to provide a larger non-magnetic gap width proximate to the trailing edge of the pole tip than the non-magnetic gap width proximate to the leading edge of the pole tip.

2. The magnetic assembly of claim 1 wherein the side shields include portions extending forward of the leading edge of the pole tip in a direction away from the trailing edge of the pole tip.

3. The magnetic assembly of claim 2 wherein the tapered inner side edges of the side shields extend along the forward portions of the side shields.

4. The magnetic assembly of claim 2 and comprising a tapered non-magnetic gap region separating the forward portions of the side shields.

5. The magnetic assembly of claim 1 and comprising a non-magnetic gap region forward of the leading edge of the pole tip and the forward non-magnetic gap region having a gap width that decreases in the downtrack direction.

6. The magnetic assembly of claim 1 and comprising a trailing shield spaced downtrack from the trailing edge of the pole tip in a direction away from the leading edge of the pole tip.

7. The magnetic assembly of claim 1 wherein the pole tip shield includes a leading shield spaced forward from the leading edge of the pole tip in a direction away from the trailing edge of the pole tip.

8. The magnetic assembly of claim 1 wherein the side shields include a non-tapered outer side edge and a width of the side shields extends from the tapered inner side edges to the non-tapered outer side edges.

9. A magnetic assembly comprising:
  a pole assembly configured to induce a magnetic flux in a pole tip having a length extending from a leading edge to a trailing edge and a width between opposed side edges;
  a pole tip shield including side shields having a length extending alongside the length of the pole tip from the leading edge to the trailing edge of the pole tip; and
  non-magnetic gap regions between the side shields and the pole tip having a non-magnetic gap width that increases along the length of the pole tip in the downtrack direction and the non-magnetic gap width does not decrease along the length of the pole tip between the leading edge of the pole tip and the trailing edge of the pole tip.

10. The magnetic assembly of claim 9 wherein the side shields have a tapered inner side edge and the non-magnetic gap regions are formed between the tapered inner side edges and the side edges of the pole tip to provide the increasing non-magnetic gap width in the downtrack direction.

11. The magnetic assembly of claim 10 wherein the tapered inner side edges extend from an intersection of the side edges of the pole tip and the leading edge of the pole tip and an intersection of the side edges of the pole tip and the trailing edge of the pole tip to provide the non-magnetic gap width that increases in the downtrack direction.

12. The magnetic assembly of claim 9 comprising a trailing shield spaced downtrack of the trailing edge of the pole tip in a direction away from the leading edge of the pole tip and a non-magnetic gap region between the trailing edge of the pole tip and the trailing shield.

13. The magnetic assembly of claim 9 wherein the side shields include stepped inner side edges to provide the non-magnetic gap width that increases in the downtrack direction.

14. A magnetic assembly comprising
  a pole assembly configured to induce a magnetic flux in a pole tip; and
  side shield means for providing a non conformal non-magnetic gap region alongside the pole tip.

15. The magnetic assembly of claim 14 wherein the side shield means includes side shields having tapered inner side edges alongside the pole tip between a leading edge and a trailing edge of the pole tip.

16. The magnetic assembly of claim 15 wherein the tapered inner side edges extend from an intersection of side edges of the pole tip and the leading edge of the pole tip to an intersection between the side edges and the trailing edge of the pole tip.

17. The magnetic assembly of claim 14 wherein the pole tip has a length extending from the leading edge of the pole tip to a trailing edge of the pole tip and a width of the non-conformal non-magnetic region increases along the entire length of the pole tip between the leading and trailing edge of the pole tip.

18. The magnetic assembly of claim 17 wherein the side shield means includes side shields have stepped inner side edges configured to form a first non-magnetic gap region proximate to a leading edge of the pole tip having a first width dimension and a second non-magnetic gap region downtrack from the first non-magnetic gap region having a second width dimension larger than the first width dimension.

19. The magnetic assembly of claim 18 wherein the pole tip has a generally uniform width dimension.

20. The magnetic assembly of claim 14 comprising a non-magnetic gap region forward from the leading edge of the pole tip having a width dimension that narrows in a direction towards the pole tip.

* * * * *